US008561093B2

(12) United States Patent
Levinson et al.

(10) Patent No.: US 8,561,093 B2
(45) Date of Patent: Oct. 15, 2013

(54) STACKING TECHNIQUES FOR THIN OPTICAL DATA STORAGE MEDIA

(75) Inventors: Eric D. Levinson, Woodbury, MN (US); James M. DePuydt, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 310 days.

(21) Appl. No.: 12/380,341

(22) Filed: Feb. 26, 2009

(65) Prior Publication Data

US 2010/0214905 A1    Aug. 26, 2010

(51) Int. Cl.
*G11B 7/24*    (2013.01)

(52) U.S. Cl.
USPC .......................................................... 720/724

(58) Field of Classification Search
USPC ........ 369/280, 281, 282, 289.1, 290.1, 272.1, 369/274; 720/724, 719, 721, 723
See application file for complete search history.

(56) References Cited

U.S. PATENT DOCUMENTS

| | | | | |
|---|---|---|---|---|
| 2,600,573 | A * | 6/1952 | Rabkin | 369/280 |
| 4,577,756 | A * | 3/1986 | Hennessy et al. | 206/308.3 |
| 4,633,458 | A * | 12/1986 | Tiefensee | 369/275.5 |
| 5,848,687 | A * | 12/1998 | Shultz | 206/308.1 |
| 5,999,513 | A * | 12/1999 | Arakawa et al. | 369/282 |
| 6,115,336 | A * | 9/2000 | Okada | 369/44.32 |
| 6,154,441 | A * | 11/2000 | Sandstrom et al. | 369/282 |
| 6,307,830 | B1 * | 10/2001 | Shultz | 369/281 |
| 6,636,475 | B2 * | 10/2003 | Carstensen | 369/281 |
| 6,666,418 | B1 * | 12/2003 | Scanlan | 248/176.1 |
| 6,680,898 | B2 * | 1/2004 | Kuchman | 369/275.4 |
| 6,842,409 | B2 * | 1/2005 | Kuchman | 369/47.1 |
| 6,901,600 | B2 * | 5/2005 | Liu | 720/719 |
| 7,197,756 | B2 * | 3/2007 | Lee et al. | 720/721 |
| 7,389,520 | B2 | 6/2008 | Hayashi et al. | |
| 7,389,871 | B2 * | 6/2008 | Crouan | 206/310 |
| 7,440,232 | B2 * | 10/2008 | Oishi | 360/133 |
| 7,458,088 | B2 * | 11/2008 | Ide et al. | 720/724 |

(Continued)

FOREIGN PATENT DOCUMENTS

| | | |
|---|---|---|
| CN | 2550876 | 5/2003 |
| JP | 10283675 A | * 10/1998 |

(Continued)

OTHER PUBLICATIONS

English Machine Translation of JP 11-053770 A (Negishi et al., Optical Information Medium, Feb. 26, 1999).*

(Continued)

*Primary Examiner* — Hoa T Nguyen
*Assistant Examiner* — Mark Fischer
(74) *Attorney, Agent, or Firm* — Kenneth E. Levitt; Dorsey & Whitney LLP

(57) ABSTRACT

This disclosure relates to thin optical storage media that may be compliant with conventional DVD drives. Unlike conventional DVDs, however, the described media generally has a thickness profile less than 1.2 mm. The media may further include one or more protrusions protruding from a major surface of the media which define a thickness of approximately 1.2 mm within the clamping area of the media. In some embodiments, the media may further include one or more recesses recessed into a major surface within the clamping area of the media. Two or more optical storage media may be packaged by stacking the media in a configuration that defines an overall stacked thickness that is less than 1.2 mm for each individual medium in the package.

19 Claims, 8 Drawing Sheets

(56) References Cited

U.S. PATENT DOCUMENTS

| | | | |
|---|---|---|---|
| 7,617,507 B2* | 11/2009 | Kim et al. | 720/719 |
| 7,947,352 B2* | 5/2011 | Sabry | 428/64.1 |
| 2003/0095497 A1* | 5/2003 | Myrtle | 369/280 |
| 2003/0218967 A1* | 11/2003 | Hsu et al. | 369/280 |
| 2003/0218968 A1* | 11/2003 | Hsu et al. | 369/282 |
| 2004/0136312 A1* | 7/2004 | Hayashi et al. | 369/275.1 |
| 2004/0170116 A1 | 9/2004 | Moloo et al. | |
| 2004/0228262 A1 | 11/2004 | Bigley | |
| 2004/0228263 A1* | 11/2004 | Netsu et al. | 369/275.3 |
| 2005/0018583 A1 | 1/2005 | Worthington et al. | |
| 2005/0018589 A1 | 1/2005 | Mizushima et al. | |
| 2005/0108743 A1* | 5/2005 | Kawamura | 720/708 |
| 2005/0169147 A1 | 8/2005 | Kobayashi et al. | |
| 2006/0144729 A1* | 7/2006 | Cheung | 206/308.1 |
| 2007/0136738 A1* | 6/2007 | Lee et al. | 720/721 |
| 2008/0115156 A1* | 5/2008 | Fetouhi et al. | 720/723 |
| 2009/0028039 A1* | 1/2009 | Hisada | 369/272.1 |
| 2009/0068391 A1* | 3/2009 | Wu et al. | 428/64.2 |
| 2010/0220582 A1* | 9/2010 | Tropillo et al. | 369/277 |

FOREIGN PATENT DOCUMENTS

| | | | |
|---|---|---|---|
| JP | 11053770 A * | 2/1999 | |
| JP | 2000090492 A * | 3/2000 | |
| JP | 2002251784 A * | 9/2002 | |
| JP | 2006012331 A * | 1/2006 | |
| JP | 2007095158 A * | 4/2007 | |
| WO | WO 9810418 A1 * | 3/1998 | |

OTHER PUBLICATIONS

"Flex-Lite Flexible DVD Disc-ProAction Media" from website http://www.proactionmedia.com/flex-lite-disc.htm?linkId=leftNav, pp. 1-4, printed Feb. 20, 2009.

* cited by examiner

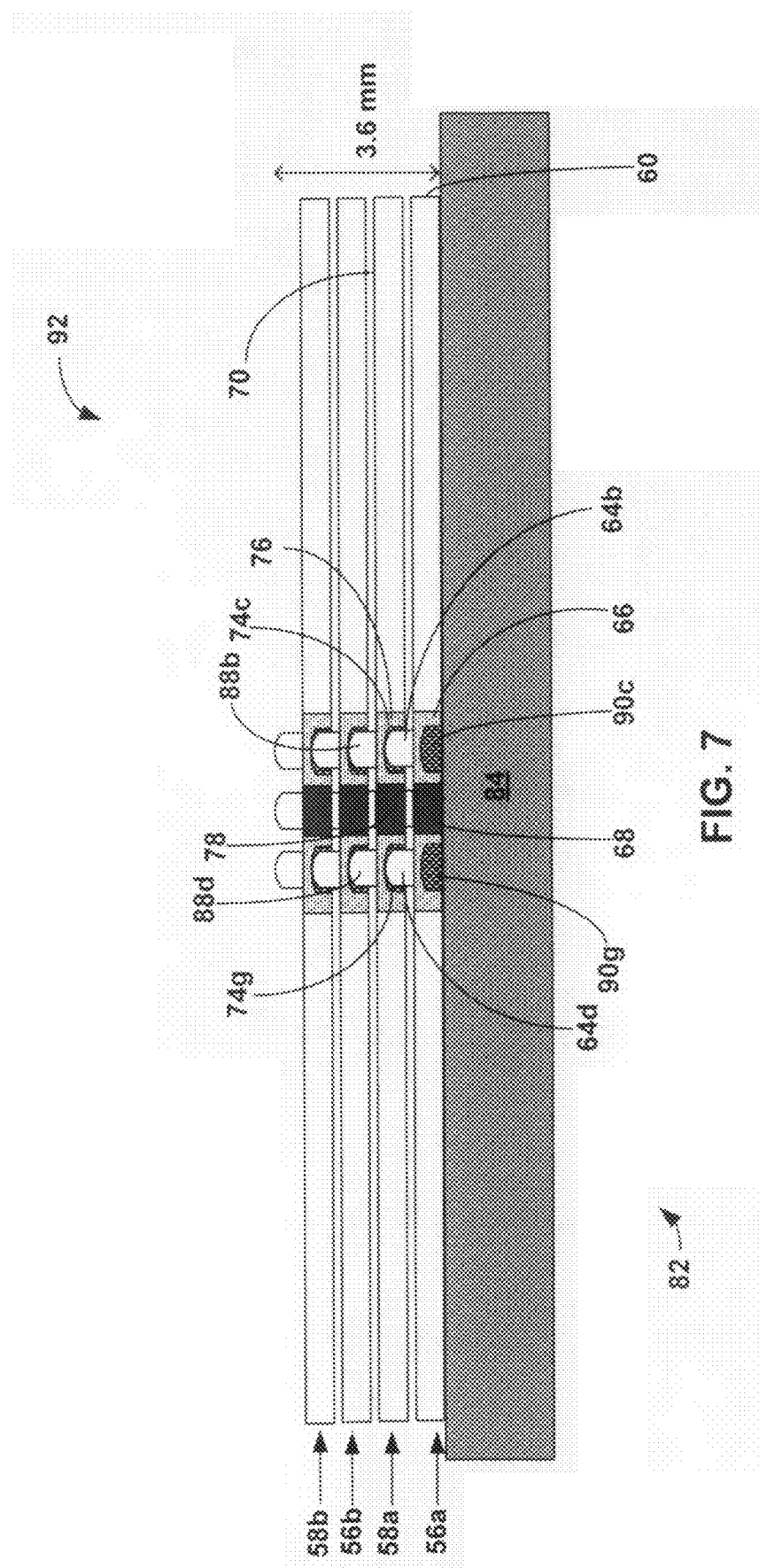

STACKING TECHNIQUES FOR THIN OPTICAL DATA STORAGE MEDIA

TECHNICAL FIELD

This disclosure relates to optical data storage media and, more particularly, digital versatile disks (DVDs).

BACKGROUND

Optical data storage disks have gained widespread acceptance for the storage, distribution and retrieval of large volumes of information. Optical data storage disks include, for example, audio CD (compact disc), CD-R (CD-recordable), CD-RW (CD-rewritable) CD-ROM (CD-read only memory), DVD (digital versatile disk), DVD-R, DVD-RW, DVD-ROM, DVD-RAM (DVD-random access memory), HD-DVD (high definition-DVD), Blu-Ray, and various other types of writable or rewriteable media, such as magneto-optical (MO) disks, phase change optical disks, and others.

Optical data storage disks are typically produced by first making a data storage disk master that has a surface pattern that represents encoded data and/or precision tracking features on the master surface. The surface pattern on the master disk, for instance, may be a collection of precisely dimensioned grooves or other features that define master pits and master lands, e.g., typically arranged in either a spiral or concentric manner. The master is typically not suitable as a mass replication surface, as the master features are typically defined within an etched photoresist layer formed over a master substrate.

After creating a suitable master, that master can be used to make a stamper, which is less fragile than the master. The stamper is typically formed of electroplated metal or a hard plastic material, and has a surface pattern that is the inverse of the surface pattern encoded on the master. An injection mold can use the stamper to fabricate large quantities of thermoplastic replica disk substrates. Also, photo-polymerization replication processes, such as rolling bead processes, have been used to fabricate replica disk substrates using stampers. In any case, each replica disk substrate may contain the data and tracking precision that was originally encoded on the master surface and preserved in the stamper. The replica disk substrates can be coated with other materials, such as dyes, phase change materials, and/or reflectors to form the optical disks.

Some types of optical data storage disks contain multiple substrates that are bonded together. For example, DVD, DVD-ROM, DVD-R, DVD-RW, and HD-DVD media constructions conventionally include two substrates, both having a thickness of approximately 0.6 millimeters, such that the overall thickness of the optical data storage disk is approximately 1.2 millimeters. Typically, one of the substrates bears the data and/or tracking information, while the other non-information bearing substrate provides the functions of backside protection, reference clamping area, a labeling area, and improved mechanical stability. In these types of bonded media constructions, the information-bearing surface of one of the substrates is sandwiched between two substrates. As such, the information bearing surface is interrogated by a drive system using a beam of laser light that is brought to focus through the information bearing substrate. This, in turn, places strict optical requirements for thickness, thickness uniformity, index of refraction, and birefringence for the information-bearing substrate.

The non-information bearing "dummy" substrate, in conventional DVD constructions, provides backside protection insofar as the information bearing surface is encased between the two bonded substrates. In addition, the non-information bearing substrate also functions to improve robustness of the medium by improving both the dynamic and static mechanical stability. A bonded non-information bearing substrate improves static mechanical stability by minimizing bending stress to the information-bearing surface. Likewise, a properly bonded non-information bearing substrate improves dynamic mechanical runout for the rotating media.

With DVD media constructions (such as DVD, DVD-ROM, DVD-R, DVD-RW, and HD-DVD), the data layer is located approximately 0.6 millimeters in from the surface of the disk closest to the laser. During reading and recording, the laser beam passes through the portion of the disk located between the laser and the data layer. This portion of the disk, the optically functional portion, must adhere to specified requirements in regard to optical thickness, optical thickness uniformity, allowable thickness range, allowable birefringence, and range of optical index of refraction for the material.

SUMMARY

In general, this disclosure relates generally to thin optical media that may be compliant with conventional DVD drives. Unlike conventional DVDs, however, the described media may have a substantial thin profile. For example, the media may have a thickness of less than 1.2 millimeters (mm) over a substantial portion of the disk. This disclosure contemplates stacking techniques and structural features to facilitate stacking of thin optical media.

The optical storage media may include a disk-shaped member with one or more protrusions protruding from a major surface of the disk-shaped member within the clamping area on the disk-shaped member. The one or more protrusions may be configured to allow the thin optical media to be secured via clamping by a conventional DVD drive, e.g., by defining a thickness of approximately 1.2 mm within at least a portion of the clamping area. In some embodiments, the disk-shaped member may include one or more recesses recessed into a major surface of the disk-shaped member within the clamping area. The one or more recesses may be configured to mate within one or more protrusions protruding from the surface of another disk-shaped member when the media are stacked on one another. Despite the one or more protrusions defining a thickness of approximately 1.2 mm, a package may include two or more of the optical data storage media configured in a manner that allows for an overall thickness that is less than 1.2 mm per medium in the package.

In one embodiment, this disclosure provides a package of two or more optical data storage media compatible with a DVD drive, the package comprising a first disk-shaped member; and a second disk-shaped member stacked on the first disk-shaped member, wherein the first disk-shaped member defines a first surface and a second surface, the first disk-shaped member comprising a first data layer and at least one first protrusion protruding from the first surface in a clamping area, wherein the first surface defines a first thickness less than 1.2 mm and the at least one first protrusion defines a second thickness equal to approximately 1.2 mm, wherein the second disk-shaped member defines a third surface and a fourth surface, the second disk-shaped member comprising a second data layer and at least one second protrusion protruding from the third surface in a clamping area, wherein the third surface defines a third thickness less than 1.2 mm and the at least one second protrusion defines a fourth thickness equal to approximately 1.2 mm, wherein at least a portion of the first surface contacts the at least one second protrusion when the second disk-shaped member is stacked on the first disk-shaped member, wherein a laser of the DVD drive reads information associated with the first data surface by interrogating light through at least a portion of the first disk-shaped member, and reads information associated with the second data surface by interrogating light through at least a portion of the second disk-shaped member.

In another embodiment, this disclosure provides an optical data storage medium compatible with a DVD drive, the medium comprising a disk-shaped member defining a first surface and a second surface, the disk-shaped member comprising a data layer; at least one protrusion protruding from the first surface in a clamping area; and at least one mated recess in the second surface corresponding to the at least one protrusion, wherein the first surface defines a first thickness less than 1.2 mm, the at least one protrusion defines a second thickness equal to approximately 1.2 mm, and the at least one mated recess defines a third thickness of less than 1.2 mm.

A package of two or more optical data storage media compatible with a DVD drive, the package comprising a first disk-shaped member; and a second disk-shaped member stacked on the first disk-shaped member, wherein the first disk-shaped member defines a first surface and a second surface, the first disk-shaped member comprising a first data layer, at least one first protrusion protruding from the first surface in a clamping area, and at least one first mated recess in the second surface corresponding to the at least one first protrusion, wherein the first surface defines a first thickness less than 1.2 mm, the at least one first protrusion defines a second thickness equal to approximately 1.2 mm, and the at least one first mated recess defines a third thickness of less than 1.2 mm, wherein the second disk-shaped member defines a third surface and a fourth surface, wherein the second disk-shaped member comprising a second data layer, at least one second protrusion protruding from the third surface in a clamping area, and at least one second mated recess in the fourth surface corresponding to the at least one second protrusion, wherein the third surface defines a fourth thickness less than 1.2 mm, the at least one second protrusions define a fifth thickness equal to approximately 1.2 mm, and the at least one second mated recess defines a sixth thickness of less than 1.2 mm, wherein the at least one first protrusion protruding from the first surface mates with the at least one second mated recess in the fourth surface when the second disk-shaped member is stacked on the first disk-shaped member, wherein a laser of the DVD drive reads information associated with the first data surface by interrogating light through at least a portion of the first disk-shaped member, and reads information associated with the second data surface by interrogating light through at least a portion of the second disk-shaped member.

The details of one or more embodiments of this disclosure are set forth in the accompanying drawings and the description below. Other features, objects, and advantages of the media described in this disclosure will be apparent from the description and drawings, and from the claims.

BRIEF DESCRIPTION OF DRAWINGS

FIG. 7 is a cross-sectional view of a spindle including four exemplary optical data storage disk media in a stacked configuration consistent with this disclosure.

DETAILED DESCRIPTION

Figure 1:
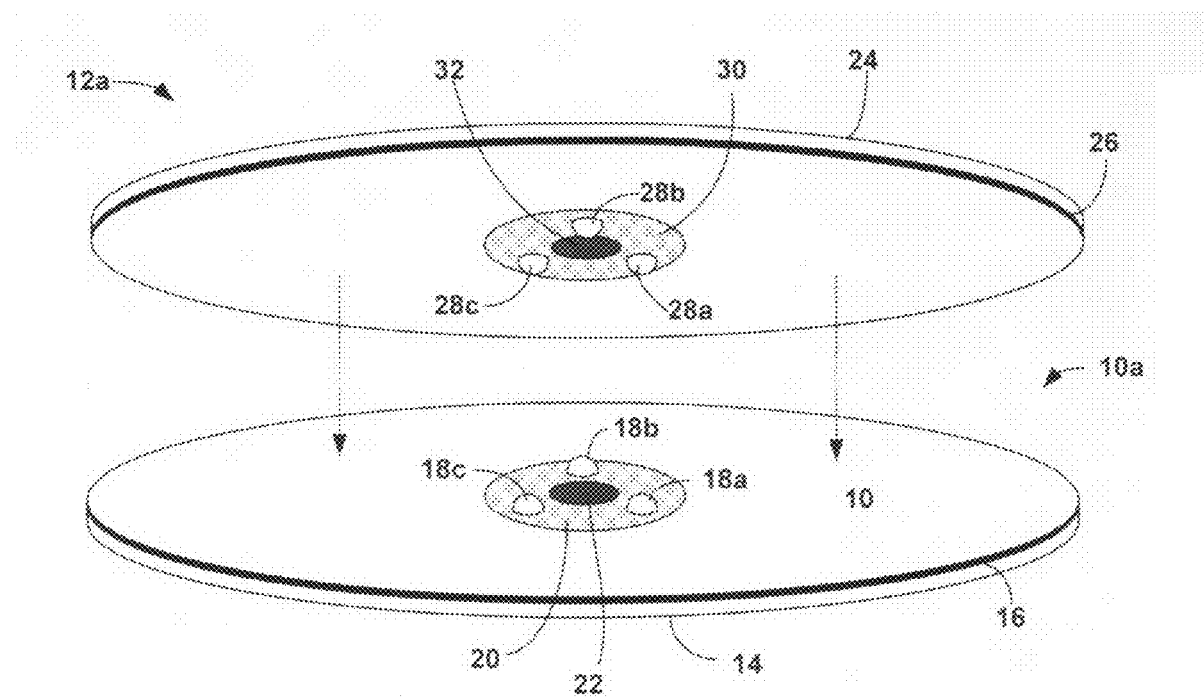
FIG. 1 is a perspective view of two exemplary optical data storage disk media consistent with this disclosure.

This disclosure generally relates to thin optical data storage media that may be compliant with conventional DVD drives, and stacking techniques for such media. In this disclosure, the acronym "DVD" refers to a digital versatile disk, such as DVD, DVD-R, DVD-RW, DVD-ROM and HD-DVD. DVDs are also sometimes called "digital video disks," particularly when the disks are used to store video information, such as motion pictures. The optical media described in this disclosure are in many ways compliant with DVD standard specifications. However, unlike DVD standard specifications, which define DVD thickness at 1.2 millimeters, the optical media of this disclosure have a thinner profile than the standard DVD thickness profile over a substantial portion of the disk. In some embodiments, the described optical data storage media may include a disk-shaped member defining a thickness of less than 1.2 mm, such as, e.g., a thickness of approximately 0.6 millimeters. Accordingly, the thickness, mass, moment of inertia, and possibly other quantities associated with the optical data storage media described in this disclosure may be non-compliant with one or more DVD specifications. Nevertheless, the optical data storage media described in this disclosure may be readable, and thus, compatible, with DVD drives.

Despite the thinner profile of the optical data storage media described herein, such optical storage media may be configured in a manner that allows the disk to be adequately secured or "clamped" for rotation of the media in the drive, e.g., during the reading and/or writing process. In particular, the disk-shaped member of the thin optical data storage media may include one or more protrusions protruding from a surface of the disk-shaped member in the area typically engaged by one or more components of a DVD-drive to clamp or secure the disk for rotation. Such an area may be referred to as the "clamping area" of the optical data storage media. The one or more protrusions may define a thickness within sections of the clamping area approximately equal to that required by a DVD-drive to secure the optical storage media for rotation, which in most cases may be a thickness of approximately 1.2 mm. In this manner, the optical data storage media may have a thinner profile than the standard DVD profile while still being securable within standard DVD drive.

In accordance with some embodiments of the disclosure, the physical configuration of the thin optical storage media, as described herein, can facilitate a reduction in packaging volume compared to that of standard DVDs. Specifically, two or more of the thin optical storage media described herein may be packaged by stacking the thin optical storage media on one another such that the overall stacked thickness is less than approximately 1.2 mm multiplied by the number of individual optical storage media in the stack. Such a reduction in stacking volume and stacking thickness may be achieved despite the respective optical storage media exhibiting a thickness of approximately 1.2 mm within the clamping area of the disk-shaped member defined by the one or more protrusions.

In some embodiments, this may include stacking the optical data storage media by mating similar surfaces of the disk-shaped members within one another. For example, the one or more protrusions of a first disk-shaped member may be configured relative to the one or more protrusions of a second disk-shaped member such that respective protrusions of each disk-shaped member do not directly contact one another in the stacking direction when the second disk-shaped member is stacked on the first disk-shaped member. Instead, the respective protrusions may mate with one another to contact the surface of the opposing disk-shaped member when stacked on one another to provide for a stacked thickness that is less than the sum of the greatest thickness of each disk, e.g., the 1.2 mm thickness defined by the one or more protrusions protruding from the surface of a disk-shaped member.

In some embodiments, a disk-shaped member of a thin optical data storage medium may include one or more recesses into the surface of the portion of the disk-shaped member associated with the clamping area. These recesses may be configured to mate with the one or more protrusions protruding from a surface of another disk-shaped member when stacked on one another. In this manner, the stacked thickness of optical data storage media may be less than the sum of the greatest thickness of each disk, e.g., the 1.2 mm thickness defined by the one or more protrusions on the surface of a disk-shaped member.

In each case, the stacked thickness of two more optical data storage disks is not limited by the thickness that is required to secure or clamp the disk within a DVD drive. By reducing the stacked thickness of optical data storage disks, the overall packaging volume and/or weight of two or more disks may be significantly reduced, thereby resulting in a reduction in associated costs, such as, e.g., the cost associated with shipping the packages of optical data storage media, the shelf space occupied by packages of optical data-storage media, and warehouse storage space occupied by packages of the optical data-storage media. As another result, a reduction in packaging volume and weight may increase the ease of handling a stack of optical storage disks, particularly in individual stacks of relatively large quantities of media, for both end users and retailers.

Additionally, the thin profile of the optical data storage media may allow for a reduction in thickness or elimination altogether of the non-information bearing "dummy" substrate typically used in conventional DVD-like optical media. By eliminating or reducing the thickness of the "dummy" substrate, a reduction in substrate raw materials may be achieved, thereby reducing the costs and providing a more environmentally friendly optical data storage medium. Similarly, the amount of packaging material required to wrap and enclose stacks of optical data storage media may be reduced by decreasing the stacked thickness of two or more optical storage media. Such an aspect provides for one or more benefits, including reduced packaging costs; decreased amount of materials required for packaging, thereby minimizing the impact on the environment during the manufacturing process; and decreased amount of packaging that will ultimately be discarded by the end user, thereby minimizing the impact on the environment during the disposal process.

FIG. 1 is a perspective view of first and second exemplary optical data storage media 10a and 12a, respectively, consistent with this disclosure. First and second media 10a and 12a may be readable by a conventional DVD drive. In accordance with the disclosure, optical data storage media 10a and 12a may be stacked on one another to form all or a part of a package of optical data storage media.

First optical data storage medium 10a includes a first disk-shaped member 14, which defines a first surface and a second surface. The first surface of first disk-shaped member 14 is the top surface of first disk-shaped member 14 in the illustration of FIG. 1. The second surface of the first disk-shaped member 14 is the bottom surface of first disk-shaped member, and is not illustrated in FIG. 1.

In the example of FIG. 1, first disk-shaped member 14 includes a disk-shaped, thermoplastic substrate that is substantially flat. As shown, the top side of the substrate may define a data layer 16. Data layer 16 may comprise replicated features formed on the surface of first substrate 14, e.g., a collection of pits and grooves formed in a concentric or spiral pattern. Data layer 16 may also comprise one or more deposited materials, such as reflectors, phase change materials, dyes, or other information layers commonly used in optical disk media constructions. In this case, a DVD drive (not shown) may read information from medium 10a by passing light through the second (bottom) surface of first disk-shaped member 14. The light passing through the second surface passes through first disk-shaped member 14, reflects off data layer 16, and the reflected light may be detected by the DVD drive for information readout. As such, first disk-shaped member 14 may be formed of an optical grade polycarbonate that allows information to be read from data layer 16 through the substrate of first disk-shaped member 14.

Figure 2:
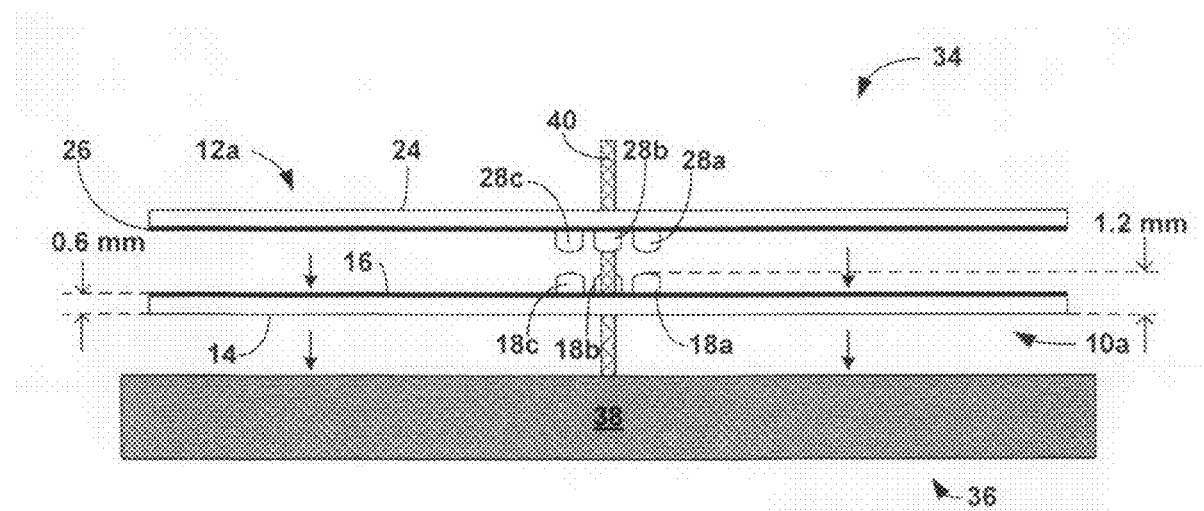
FIG. 2 is a side view of a packaging spindle including the two exemplary optical data storage disk media of FIG. 1.

First disk-shaped member 14 further includes a first protrusion 18a, a second protrusion 18b and a third protrusion 18c (collectively "first protrusions 18") protruding from the first surface of first disk-shaped member 14. As illustrated, first protrusions 18 protrude from the first surface within clamping area 20. Clamping area 20 generally corresponds to the area of the first surface of first disk-shaped member 14 typically engaged by one or more components of a DVD drive to clamp or secure optical storage medium 10a for rotation. As a result, clamping area 20 may not define an information bearing surface at least to the extent that the clamping components of a DVD drive prevent information from being read from within clamping area 20. In most cases, including the example shown in FIG. 1, clamping area 20 is the area proximate aperture 22 defined by first disk-shaped member 14, which is centered on the central axis of disk-shaped member 14. Within clamping area 20, first protrusions 18 define a thickness that is required by a DVD drive to adequately secure the disk for rotation within the drive. As indicated in FIG. 2, first protrusions 18 define a thickness of 1.2 mm within clamping area 20, which is the clamping thickness required by standard DVD drives. However, the thickness defined by first protrusions 18 is not limited to 1.2 mm but instead may be any thickness required by the DVD drive used in conjunction with first optical data-storage medium 10a.

Second optical data storage medium 12a includes second disk-shaped member 24, which defines a third surface and a fourth surface. The third surface of second disk-shaped member 24 is the bottom surface of second disk-shaped member 24 in the illustration of FIG. 1. The fourth surface of the second disk-shaped member 24 is the top surface of second disk-shaped member 24, and is not illustrated in FIG. 1. As will be apparent from the below description, second optical data storage medium 12a may be configured substantially the same as that of first optical data storage medium 10a although second optical data storage medium 12a is illustrated in an inverted orientation relative to first optical data storage medium 10a. As such, the third surface and the fourth surface of second disk-shaped member 24 generally corresponds to the first surface and second surface, respectively, of first disk-shaped member 14.

Second disk-shaped member 24 includes a disk-shaped, thermoplastic substrate that is substantially flat. As shown, the bottom side of the substrate may define a data layer 26. Data layer 26 may comprise replicated features formed on the surface of second substrate 24, e.g., a collection of pits and grooves formed in a concentric or spiral pattern. Data layer 26 may also comprise one or more deposited materials, such as reflectors, phase changes materials, dyes, or other information layers commonly used in optical disk media constructions. In this case, a DVD drive (not shown) may read information from medium 12a by passing light through the fourth (top) surface of second disk-shaped member 24. The light passing through the fourth surface passes through second disk-shaped member 24, reflects off data layer 26, and the reflected light may be detected by the DVD drive for information readout. As such, second disk-shaped member 24 may include an optical grade polycarbonate that allows information to be read from data layer 26 through the substrate of second-disk shaped member 24.

Second disk-shaped member 24 further includes a first protrusion 28a, a second protrusion 28b and a third protrusion 28c (collectively "second protrusions 28") protruding from the third surface of second disk shaped-member 24. As illustrated, second protrusions 28 protrude from the third surface within clamping area 30. Similar to that of clamping area 20, clamping area 30 generally corresponds to the area of the third surface of second disk-shaped member 24 typically engaged by one or more components of a DVD drive to clamp or secure optical storage medium 12a for rotation. Clamping area 30 is the area proximate aperture 32 defined by second disk-shaped member 24, which is centered on the central axis of disk-shaped member 24. Within clamping area 30, second protrusions 28 define a thickness that is required by a DVD drive to adequately secure the disk for rotation within the drive. Similar to that of first protrusions 18, second protrusions 28 define a thickness of 1.2 mm within clamping area 32, which is the clamping thickness typically required by standard DVD drives. However, the thickness defined by second protrusions 28 is not limited to 1.2 mm but instead may be any thickness required by the DVD drive used in conjunction with second optical data-storage medium 12a.

FIG. 2 is an exploded side view of an example package 34 including first optical data storage disk medium 10a and second optical data storage medium 12a of FIG. 1 on spindle 36. In general, the first surface of first disk-shaped shaped member 14 defines a thickness of less than 1.2 mm relative to the second (bottom) surface of disk-shaped member 14. Similarly, the third surface of second disk-shaped member 24 defines a thickness of less than 1.2 mm relative to the fourth (top) surface of disk-shaped member 24. In particular, in the example of FIG. 2, the first surface of first disk-shaped member 14 defines a thickness of approximately 0.6 mm relative to the second (bottom surface), as indicated. Similarly, the third surface of second disk-shaped member 24 defines a thickness of approximately 0.6 mm, although not explicitly indicated in FIG. 2.

However, the thickness defined by the first and third surfaces relative to the second and fourth surface, respectively, is not limited to approximately 0.6 mm but instead may vary in accordance with embodiments of this disclosure. For example, the thickness defined by the first and third surfaces relative to the second and fourth surface, respectively, may be less than 1.2 mm but greater than or equal to approximately 0.6 mm. In any case, the thickness over a substantial portion of first and second disk-shaped members 14 and 24 is less than 1.2 mm. In this aspect, first and second optical data storage media 10a and 12a may be considered thin optical data storage media relative to a standard DVD disk having a thickness profile of approximately 1.2 mm.

In embodiments in which a disk-shaped member has thickness of approximately 0.6 mm over the majority of the medium, such as first disk-shaped member 14 and second disk-shaped member 24, the disk shaped member may each include a single substrate having a thickness of approximately 0.6 mm rather than the combination of two or more substrates bonded together, e.g., a combination including an information bearing substrate bonded to a "dummy" substrate. However, in other embodiments, a disk-shaped member may include the combination of two or more substrates. For example, if the first surface of first disk-shaped member 14 defines a thickness of greater than 0.6 mm but less than 1.2 mm relative to the second surface, first disk shaped member 14 may include an information bearing substrate having a thickness of approximately 0.6 mm and one or more "dummy" substrates than define an overall thickness of less than 0.6 mm. In such an embodiment, the one or more "dummy" substrates may be bonded to the information bearing substrates such that first disk-shaped member 14 has an overall thickness of greater than 0.6 mm but less than 1.2 mm.

As further indicated in FIG. 2, first protrusions 18 protruding from the first surface of first disk-shaped member 14 in clamping area 20 (shown in FIG. 1) define a thickness of approximately 1.2 mm relative to the second (bottom) surface of first disk-shaped member 14. Similar to that of first protrusions 18, second protrusions 28 protruding from the third (bottom) surface of second disk-shaped member 24 in clamping area 30 (shown in FIG. 1) define a thickness of approximately 1.2 mm relative to the fourth surface of second disk-shaped member 24. As previously described, a thickness of 1.2 mm generally corresponds to the thickness required for a standard DVD drive to secure a DVD disk via clamping for rotation within the DVD drive. By providing first protrusions 18 and second protrusions 28 within clamping areas 20 and 30, respectively, first and second disk-shaped members 14 and 24 may operate within a standard DVD drive despite their relatively thin profile, as previously described.

First protrusions 18 may be provided on the first surface of first disk-shaped member 14 in clamping area 20 and second protrusions 28 may be provided on the third surface of second disk-shaped member 24 in clamping area 30 via any suitable technique. For example, first protrusions 18 may be integrally formed on the surface of the substrate that defines the first surface of disk-shaped member 14 during the injection molding process. Alternatively, first protrusions 18 may be provided on the surface by adhering suitable protrusions to the first surface of disk-shaped member 14 after the formation of the substrate defining the first surface.

Spindle 36 includes base 38 and vertical rod 40 onto which first and second storage media 10a and 12a may be stacked. In particular, first and second storage media 10a and 12a are illustrated in an orientation representative of the orientation of first storage media 10a relative to that of second storage media 12a shown in FIG. 1 only with vertical rod 40 inserted through apertures 22 and 32. When completely stacked on one another in the configuration shown in FIG. 2, the second (bottom) surface of first disk-shaped member 14 rests on the top surface of base 38. First protrusions 18 and second protrusions 28 will mate with one another such that first protrusions 18 contact a portion of the third (bottom) surface of second disk-shaped member 24 within clamping area 30 (show in FIG. 1) and second protrusions contact a portion of the first (top) surface of first disk-shaped member 14 within clamping area 20 (shown in FIG. 1). As will be further apparent from the description of FIG. 3, stacking first and second storage media 10a and 12a in such an orientation allows for the stacked thickness of first and the second storage media to be less than 2.4 mm, e.g., approximately 1.8 mm, despite the fact that first protrusion 18 of first storage media 10a and second protrusions 28 of second storage media 24 each define a thickness of approximately 1.2 mm. In this manner, first and second storage media 10a and 12a facilitate a reduction in the stacking thickness of a package of two or more optical storage media compatible with a DVD drive compared to that of conventional DVD disks.

Figure 3:
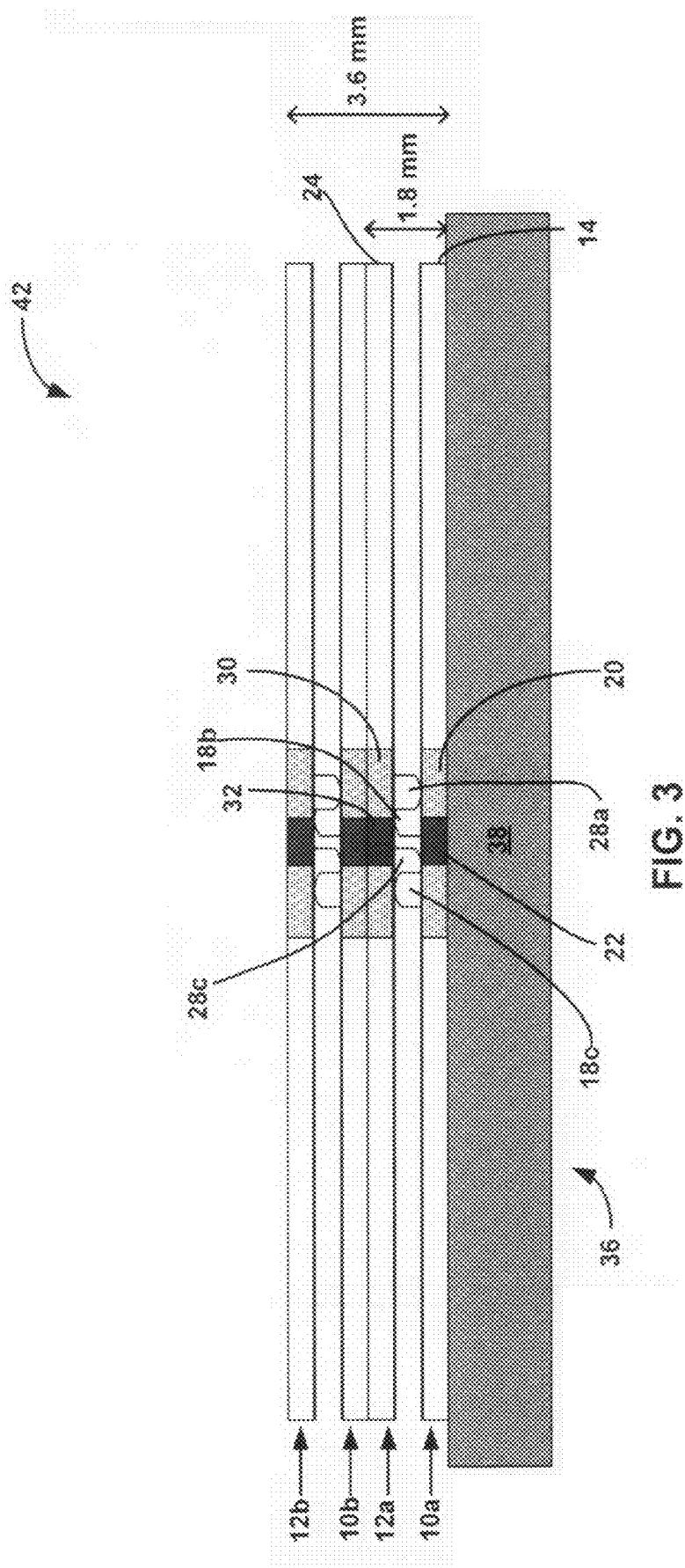
FIG. 3 is a cross-sectional view of a spindle including four exemplary optical data storage disk media in a stacked configuration consistent with this disclosure.

FIG. 3 is a cross-sectional view of example package 42 including four exemplary optical data storage media in a stacked configuration on spindle 36. In particular, FIG. 3 illustrates base 38 of spindle 36 (vertical rod 40 of spindle 36 is not illustrated for clarity), first optical storage medium 10a, second optical storage medium 12a (all previously described with respect to FIGS. 1 and/or 2), third optical storage medium 10b, and fourth optical storage medium 12b. Third optical storage medium 10b and fourth optical storage medium 12b are substantially the same as first optical storage medium 10a and second optical storage medium 12a, respectively, and are orientated relative to one another substantially the same as that previously described with respect to the orientation of first and second optical storage media 10a and 12a relative to one another. For reference, the cross-sectional view of package 42 is illustrated along a plane that is orthogonal to the top surface of base 38 and which bisects protrusion 18c and aperture 22 of first optical data storage medium 10a, and protrusion 28a and aperture 32 of second optical data storage medium 12a in the orientation shown in FIGS. 1 and 2.

Optical data storage media 10a, 12a, 10b, and 12b are stacked on one another in accordance with an embodiment of the disclosure. As shown, the second (bottom) surface of first disk-shaped member 14 rests on the top surface of base 38 of spindle 36. Protrusion 18c and protrusion 18b of first disk-shaped member 14 contact a portion of the third (bottom) surface of second disk-shaped member 24 within clamping area 30 (shown in FIG. 1). Protrusion 28a and protrusion 28c of second disk-shaped member 24 contact a portion of the first (top) surface of first disk-shaped member 14 within clamping area 20 (shown in FIG. 1). The bottom surface of third optical storage medium 10b is in contact with the fourth (top) surface of second optical storage medium 12a. Fourth optical storage medium 12b is stacked directly on top of third optical storage medium 10b such that the protrusions protruding from the each respective disk-shaped member are in contact with the major surface of the opposing disk-shaped member in the clamping area. Such an orientation is substantially the same as that of first optical storage medium 10a and second optical storage medium 12a.

Notably, when optical data storage media 10a, 12a, 10b, and 12b are stacked as shown in FIG. 3, example package 42 exhibits a stacked thickness that is less than the stacked thickness that would be exhibited by a stack of four conventional DVD disks each having a thickness of approximately 1.2 mm. As indicated in FIG. 3, the overall stacked thickness of optical data storage media 10a, 12a, 10b, and 12b of package 42 is approximately 3.6 mm, rather than a stacked thickness of approximately 4.8 mm exhibited by four conventional DVD disks, i.e., 1.2 mm for each conventional DVD disk. In this manner, the stacked configuration of optical storage media 10a, 12a, 10b, and 12b facilitates a reduction in the stacking thickness of a package of two or more optical data storage media compatible with a DVD drive compared to that of conventional DVD disks. Depending on the exact thicknesses defined by the optical data storage media, embodiments of optical data storage media in such stacked configurations may provide for a decrease in stacked thickness up to approximately 25 percent relative to conventional stacks of optical storage media containing the same number of media, such as, e.g., a reduction of greater than approximately 10 percent or a reduction of greater than approximately 20 percent. In other words, assuming an average thickness of 1.2 mm for conventional optical storage media, the average stacked thickness for each optical storage medium in such a stack may be as low as approximately 0.9 mm, such as, e.g., an average stacked thickness of less than approximately 1.08 mm or an average stacked thickness of less than approximately 0.96 mm.

Although package 42 is shown in FIG. 3 with optical data storage media 10a, 12a, 10b, and 12b stacked on spindle 36, packages of the disclosure are not limited as such. For example, in some embodiments, a package of two or more optical storage media, such as, optical storage media 10a and 12b, may be packaged in other packaging that does not necessarily include a spindle. The features of this disclosure and stacking arrangements can provide advantages of compact packaging regardless of whether or not the package includes a spindle.

FIGS. 4A-D are top views of exemplary protrusion configurations within the clamping areas 44a-d of an optical data storage disk medium. For example, clamping areas 44a-d may generally correspond to either of clamping areas 20 and 30 of first optical data storage medium 10a and second optical data storage medium 12a, respectively.

Figure 4A:
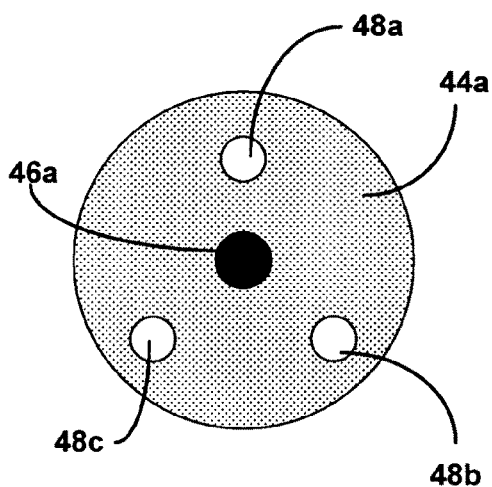
FIGS. 4A-D are top views of exemplary protrusion configurations within the clamping area of an optical data storage disk medium.

FIG. 4A illustrates an embodiment in which clamping area 44a surrounds aperture 46a and includes three circular protrusions 48a-c. Such a protrusion configuration is substantially the same as that shown in the embodiments of FIGS. 1-3.

Figure 4B:
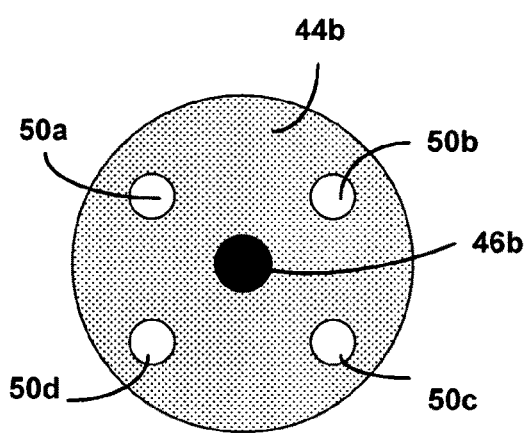

FIG. 4B illustrates an embodiment in which clamping area 44b surrounds aperture 46b and includes four circular protrusions 50a-d which are spaced evenly within clamping area 44b.

Figure 4C:
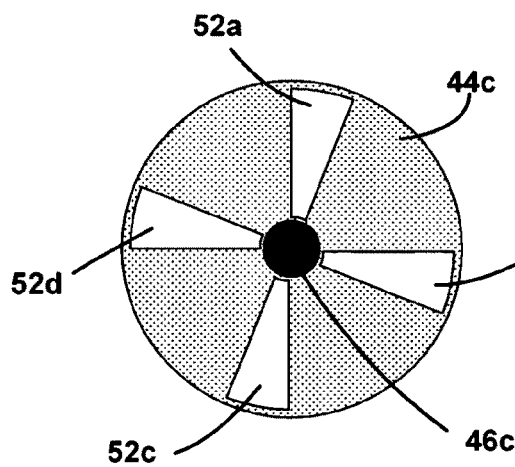

FIG. 4C illustrates an embodiment in which clamping area 44c surrounds aperture 46c and include four protrusions 52a-d that are roughly pie-shaped. Unlike the circular protrusions of FIGS. 4A and 4B, each of protrusions 52a-d within clamping area 46c extend radially from the inner circumference to the outer circumference of clamping area 44c. Such a configuration may allow for a DVD drive to clamp the optical data storage media at any radial position within clamping area 44c rather than only one radial position, such as that defined by protrusions 48a-d in clamping area 44a or protrusions 50a-d in clamping area 44b. Furthermore, protrusions 52a-d provide for an increased amount of surface protruding within clamping area 44c compared to that of protrusions 48a-c and 50a-d, which may provide for more secure clamping of an optical storage disk within a DVD disk drive via protrusions 52a-d.

Figure 4D:
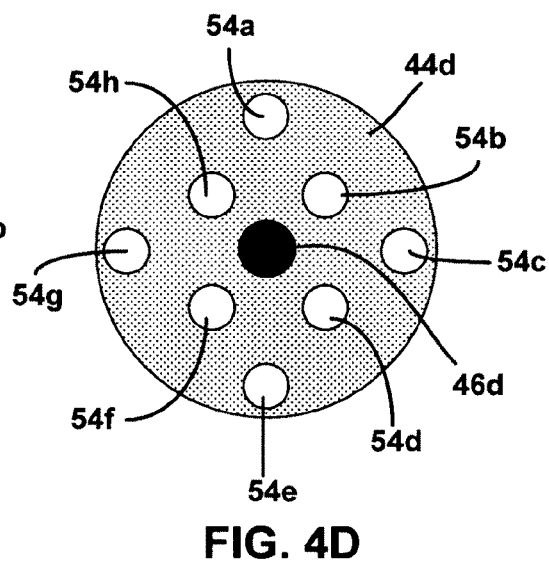

FIG. 4D illustrates an embodiment in which clamping area 44d surrounds aperture 46d and includes eight circular protrusions 54a-h. The radial position of protrusions 54a-h varies within clamping area 44d. In particular, protrusions 54b, 54d, 54f, and 54h are all positioned closer to the inner circumference of clamping area 44d and protrusions 54a, 54c, 54e, and 54g are positioned closer to the outer circumference of clamping area 44d. Similar to that of protrusions 54a-d of FIG. 4C, such a configuration may allow for a DVD drive to clamp the optical data storage media at more than one radial position within clamping area 44c rather than only one radial position, such as that defined by protrusions 48a-d in clamping area 44a or protrusions 50a-d in clamping area 44b.

While a number of protrusion configurations are described with respect to FIGS. 4A-D, embodiments are not limited as such. Instead, the clamping area of an optical data storage disk according to embodiments of the disclosure may include one or more protrusions in a configuration that allows the optical data storage disk to be adequately secured or clamped within a DVD drive to function properly while also allowing for the optical data storage medium to be stacked on another optical storage medium with substantially the same configuration in a manner that allows for a reduction in stacked thickness, as described herein. In some examples, such as those shown in FIGS. 4A-D, the protrusion within a clamping area of [[a]] an optical data storage medium will protrude from less than 50% of the clamping area to allow for a similarly configured optical data storage medium to be stacked on the storage medium, e.g., as shown in FIG. 3.

Figure 5:
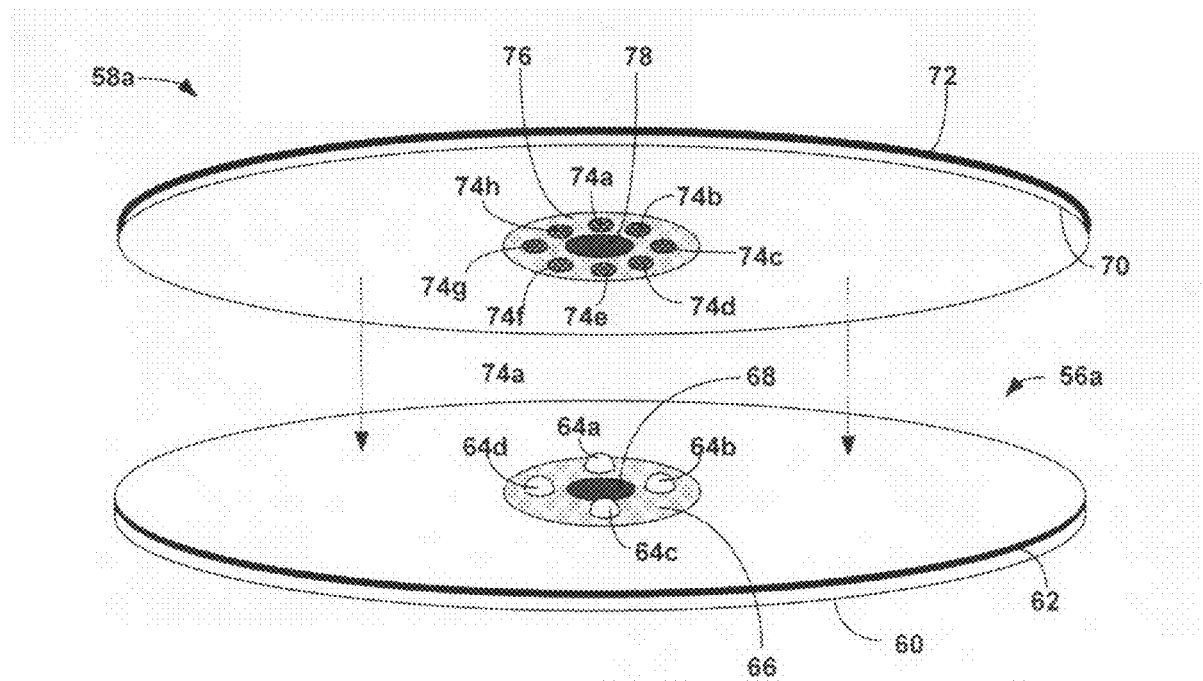
FIG. 5 is a perspective view of two exemplary optical data storage disk media consistent with this disclosure.

FIG. 5 is a perspective view of first and second exemplary optical data storage media 56a and 58a, respectively, consistent with this disclosure. Optical data storage media 56a and 58a may be readable by a conventional DVD drive. In accordance with the disclosure, optical data storage media 56a and 58a may be stacked on one another to form all or a part of a package of optical data storage media.

First optical data storage medium 56a includes a first disk-shaped member 60, which defines a first surface and a second surface. The first surface of first disk-shaped member 60 is the top surface of first disk-shaped member 60 in the illustration of FIG. 5. The second surface of the first disk-shaped member 60 is the bottom surface of first disk-shaped member 60, and is not illustrated in FIG. 5. However, as will be described in further detail below, the bottom surface of first disk-shaped member 60 may be substantially the same as the bottom surface of second disk-shaped member 70 shown in FIG. 5.

In the example of FIG. 5, first disk-shaped member 60 includes a disk-shaped, thermoplastic substrate that is substantially flat. As shown, the top side of the substrate may define a data layer 62. Data layer 62 may comprise replicated features formed on the surface of first substrate 60, e.g., a collection of pits and grooves formed in a concentric or spiral pattern. Data layer 62 may also comprise one or more deposited materials, such as reflectors, phase change materials, dyes, or other information layers commonly used in optical disk media constructions. In this case, a DVD drive (not shown) may read information from medium 56a by passing light through the second (bottom) surface of first disk-shaped member 60. The light passing through the second surface passes through first disk-shaped member 60, reflects off data layer 62, and the reflected light may be detected by the DVD drive for information readout. As such, first disk-shaped member 60 may be formed of an optical grade polycarbonate that allows information to be read from data layer 62 through the substrate of first-disk shaped member 60.

Figure 6:
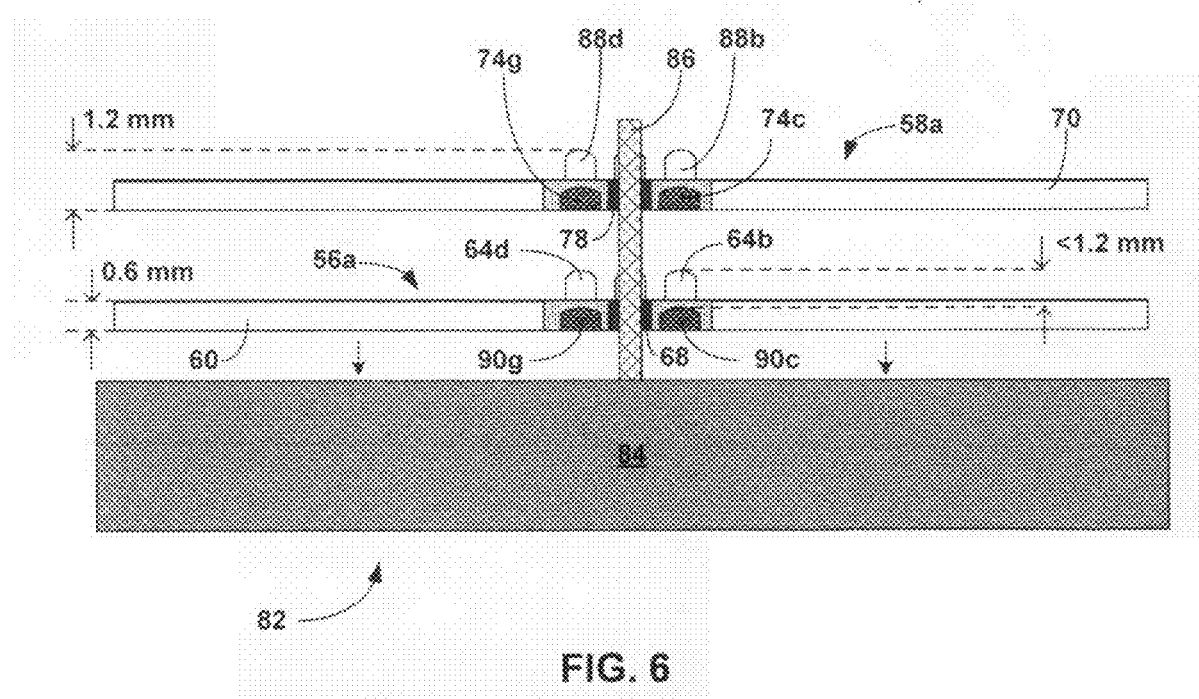
FIG. 6 is an exploded cross-sectional view of a packaging spindle including the two exemplary optical data storage disk media of FIG. 5.

First disk-shaped member 60 further includes a first protrusion 64a, a second protrusion 64b, third protrusion 64c, and fourth protrusion 64d (collectively "first protrusions 64") protruding from the first surface of first disk shaped-member 60. As illustrated, first protrusions 64 protrude from the first surface within clamping area 66. Clamping area 66 generally corresponds to the area of the first surface of first disk-shaped member 60 typically engaged by one or more components of a DVD drive to clamp or secure optical storage medium 56a for rotation. As such, clamping area 66 may not define an information bearing surface at least to the extent that the clamping components of a DVD drive prevent information from being read from within clamping area 66. In most cases, including the example shown in FIG. 5, clamping area 66 is the area proximate aperture 68 defined by first disk-shaped member 60, which is centered on the central axis of disk-shaped member 60. Within clamping area 66, first protrusions 64 define a thickness that is required by a DVD drive to adequately secure the disk for rotation within the drive. As indicated in FIG. 6, first protrusions 64 define a thickness of 1.2 mm within clamping area 66, which is the clamping thickness required by standard DVD drives. However, the thickness defined by first protrusions 64 is not limited to 1.2 mm but instead may be any thickness required by the DVD drive used in conjunction with first optical data-storage medium 56a.

Second optical data storage medium 58a includes second disk-shaped member 70, which defines a third surface and a fourth surface. The third surface of the second disk-shaped member 70 is the top surface of second disk-shaped member 70, and is not illustrated in FIG. 5. The fourth surface of second disk-shaped member 70 is the bottom surface of second disk-shaped member 70 in the illustration of FIG. 5.

As will be apparent from the below description, second optical data storage medium 58a may be configured substantially the same as that of first optical data storage medium 56a. As such, the third surface and the fourth surface of second disk-shaped member 70 generally corresponds to the first surface and second surface, respectively, of first disk-shaped member 60.

Second disk-shaped member 70 includes a disk-shaped, thermoplastic substrate that is substantially flat. As shown, the top side of the substrate may define a data layer 72. Data layer 72 may comprise replicated features formed on the surface of second substrate 70, e.g., a collection of pits and grooves formed in a concentric or spiral pattern. Data layer 72 may also comprise one or more deposited materials, such as reflectors, phase change materials, dyes, or other information layers commonly used in optical disk media constructions. In this case, a DVD drive (not shown) may read information from medium 58a by passing light through the fourth (top) surface of second disk-shaped member 70. The light passing through the fourth surface passes through second disk-shaped member 70, reflects off data layer 72, and the reflected light may be detected by the DVD drive for information readout. As such, second disk-shaped member 70 may include an optical grade polycarbonate that allows information to be read from data layer 72 through the substrate of second disk-shaped member 70.

Second disk-shaped member 70 further includes eight individual recesses 74a-h (collectively "first recesses 74") recessed into the fourth surface of second disk shaped-member 70. As illustrated, first recesses 74 are recessed into the fourth surface of second disk-shaped member 70 within clamping area 76. Similar to clamping area 66, clamping area 76 generally corresponds to the area of the fourth surface of second disk-shaped member 70 typically engaged by one or more components of a DVD drive to clamp or secure optical storage medium 58a for rotation. Clamping area 76 is the area proximate aperture 78 defined by second disk-shaped member 70, which is centered on the central axis of disk-shaped member 70. Notably, within clamping area 76, first recesses 74 are configured to mate with first protrusions 64 protruding from the first surface of first disk-shaped member 60 when second optical data storage medium 58a is stacked on top of first optical data storage medium 56a, as shown in FIG. 5.

FIG. 6 is an exploded cross-sectional view of an example package 80 including first optical data storage medium 56a and second optical data storage medium 58a of FIG. 5 on spindle 82. Spindle 82 includes base 84 and vertical rod 86 onto which first and second optical storage media 56a and 58a may be stacked. First and second storage media 56a and 58a are illustrated in an orientation representative of the orientation of first storage media 56a relative to that of second storage media 58a shown in FIG. 5 only with vertical rod 86 inserted through apertures 68 and 78. In particular, the cross-sectional view of package 80 is illustrated along a plane that is orthogonal to the top surface of base 84 and which bisects protrusions 64b, 64d and aperture 68 of first optical data storage medium 10a, and recesses 74c, 74g and aperture 78 of second optical data storage medium 58a in the orientation shown in FIG. 5.

As illustrated, the first surface of first disk-shaped shaped member 60 defines a thickness of less than 1.2 mm relative to the second (bottom) surface of disk-shaped member 60. Similarly, the third surface of second disk-shaped member 70 defines a thickness of less than 1.2 mm relative to the fourth (bottom) surface of disk-shaped member 70. In particular, in the example of FIG. 2, the first surface of first disk-shaped member 60 defines a thickness of approximately 0.6 mm relative to the second (bottom surface), as indicated. Similarly, the third surface of second disk-shaped member 70 defines a thickness of approximately 0.6 mm relative to the fourth surface, although not explicitly indicated in FIG. 6.

However, the thickness defined by the first and third surfaces relative to the second and fourth surface, respectively, is not limited to approximately 0.6 mm but instead may vary in accordance with embodiments of this disclosure. For example, the thickness defined by the first and third surfaces relative to the second and fourth surface, respectively, may be less than 1.2 mm but greater than or equal to approximately 0.6 mm. In any case, the thickness over a substantial portion of first and second disk-shaped members 60 and 70 is less than 1.2 mm. In this aspect, first and second optical data storage media 56a and 58a may be considered thin optical data storage media relative to standard DVD disks which have a thickness profile of approximately 1.2 mm.

In embodiments in which a disk-shaped member has thickness of approximately 0.6 mm over the majority of the medium, such as first disk-shaped member 60 and second disk-shaped member 70, the disk-shaped member may each include a single substrate having a thickness of approximately 0.6 mm rather than the combination of two or more substrates bonded together, e.g., a combination including an information bearing substrate bonded to a "dummy" substrate. However, in other embodiments, a disk-shaped member may include the combination of two or more substrates. For example, if the first surface of first disk-shaped member 60 defines a thickness of greater than 0.6 mm but less than 1.2 mm relative to the second surface, first disk shaped member 60 may include an information bearing substrate having a thickness of approximately 0.6 mm and one or more "dummy" substrates than define an overall thickness of less than 0.6 mm. In such an embodiment, the one or more "dummy" substrates may be bonded to the information bearing substrates such that first disk-shaped member 60 has an overall thickness of greater than 0.6 mm but less than 1.2 mm.

As previously mentioned, the third (top) surface of second disk-shaped member 70 is substantially the same as that of the first (top) surface of first disk-shaped member 60. Accordingly, second disk-shaped member 70 includes four protrusions protruding from the third surface, which may be referred to collectively as second protrusions 88. In FIG. 6, protrusion 88b and protrusion 88d are shown protruding from the third (top) surface.

Furthermore, the second (bottom) surface of first disk-shaped member 60 is substantially the same as that of the fourth (bottom) surface of second disk-shaped member 70. Accordingly, first disk-shaped member 60 includes eight recesses recessed into the second surface, which may be referred to collectively as second recesses 90. In FIG. 6, recess 90c and recess 90g are shown recessed into the second (bottom) surface of first disk-shaped member 60.

As indicated in FIG. 6, second protrusions 88 protruding from the third (top) surface of second disk-shaped member 70 define a thickness of approximately 1.2 mm relative to the fourth (bottom) surface of the second disk-shaped member 70. Similarly, first protrusions 64 protruding from the first surface of first disk-shaped member 60 in clamping area 66 (shown in FIG. 5) define a thickness of approximately 1.2 mm relative to the second (bottom) surface of first disk-shaped member 60, although not explicitly indicated in FIG. 6. As previously described, a thickness of 1.2 mm generally corresponds to the thickness required for a standard DVD drive to secure a DVD disk via clamping for rotation within the DVD drive. By providing first protrusions 64 and second protrusions 88 within clamping areas 66 and 76 respectively, first and second disk-shaped members 60 and 70 may operate within a standard DVD drive despite their relatively thin profile, as previously described.

As further indicated in FIG. 6, second recesses 90 recessed into the second (bottom) surface of first disk-shaped member 60 define a thickness of less than 1.2 mm relative to the top surface of first protrusions 64. Similarly, first recesses 74 recessed into the fourth (bottom) surface of second disk-shaped member 70 in clamping area 76 (shown in FIG. 5) define a thickness of less than 1.2 mm relative to the top surface of first protrusions 64, although not explicitly indicated in FIG. 6.

When first and second optical storage media 56a and 58a are stacked on one another in the configuration shown in FIG. 6, the second (bottom) surface of first disk-shaped member 56a rests on the top surface of base 84. First protrusions 64 mate with first recesses 74 such that first protrusions 64 penetrate the major plane defined by the fourth (bottom) surface of second disk-shaped member 70.

Depending on the depth of the first recesses 74 relative to the height of first protrusions 64, in some embodiments, first protrusions 64 may contact the upper surface of first recesses 74. For example, as indicated in FIG. 6, first protrusions 64 have a height of approximately 0.6 mm, i.e., the difference between 1.2 mm and 0.6 mm. If first recesses 74 have a depth of approximately 0.4 mm, i.e., define a thickness of 0.8 mm relative to the top of second recesses 88, then first protrusions 64 may contact the upper surface of first recesses 74. In such a case, the first (top) surface of first disk-shaped member 60 will not be in contact with the third (bottom) surface of second disk-shaped member 70 when second optical data storage medium 58a is stacked on first optical data storage medium 56a as described.

Alternatively, in some embodiments, first protrusions 64 may mate with first recesses 74 but not contact the upper surface of first recesses 74. For example, if first protrusions 64 have a height of approximately 0.4 mm and first recesses 74 have a depth of approximately 0.5 mm, i.e., define a thickness of 0.7 mm relative to the top of second recesses 88, then first protrusions 64 may penetrate first recesses 74 but not contact the upper surface of first recesses 74. Instead, in such a case, the first (top) surface of first disk-shaped member 60 will be in contact with the fourth (bottom) surface of second disk-shaped member 70 when second optical data storage medium 58a is stacked on first optical data storage medium 56a as described. Such a configuration may provide for greater stability for a stack of plurality of optical data storage media relative to the configuration in the example described above wherein the top optical data storage medium rests primarily on the protrusions of the adjacent optical data storage medium.

As will be further apparent from the description of FIG. 7, the configuration of first and second optical storage media 56a and 58a allows for the respective disks to be stacked in a manner in which the stacked thickness is less than 2.4 mm despite the fact that first protrusion 64 of first storage media 56a and second protrusions 88 of second storage media 58a each define a thickness of approximately 1.2 mm. In this manner, first and second storage media 56a and 58a facilitate a reduction in the stacking thickness of a package of two or more optical storage media compatible with a DVD drive compared to that of conventional DVD disks.

FIG. 7 is a cross-sectional view of example package 92 including four exemplary optical data storage media in a stacked configuration on spindle 82. In particular, FIG. 3 illustrates base 84 of spindle 82 (vertical rod 86 of spindle 82 is not illustrated for clarity), first optical storage medium 56a, second optical storage medium 58a (all previously described with respect to FIGS. 5 and/or 6), third optical storage medium 56b, and fourth optical storage medium 58b. Third optical storage medium 56b and fourth optical storage medium 58b are substantially the same as first optical storage medium 56a and second optical storage medium 58a, respectively, and are orientated relative to one another substantially the same as that previously described with respect to the orientation of first and second optical storage media 56a and 58a relative to one another. For reference, the cross-sectional view of package 80 is illustrated along a plane that is orthogonal to the top surface of base 84 and which bisects protrusions 64b, 64d and aperture 68 of first optical data storage medium 10a, and recesses 74c, 74g and aperture 78 of second optical data storage medium 58a in the orientation shown in FIG. 5.

Optical data storage media 56a, 58a, 56b, and 58b are stacked on one another in accordance with an embodiment of the disclosure. In the example of FIG. 7, the second (bottom) surface of first disk-shaped member 60 rests on the top surface of base 84 of spindle 82. Protrusion 64b and protrusion 64d of first disk-shaped member 60 mate with recess 74c and recess 74g, respectively, in the fourth (bottom) surface of second disk-shaped member 70. As shown, third optical data storage medium 56b is similarly stacked on second optical data storage medium 58a, and fourth optical data storage medium 58b is similarly stacked directly on third optical data storage medium 56b.

Notably, when optical data storage media 56a, 58a, 56b, and 58b are stacked as shown in FIG. 7, example package 92 exhibits a stacked thickness that is less than the stacked thickness that would be exhibited by a stack of four conventional DVD disks each having a thickness of approximately 1.2 mm. In particular, in the example of FIG. 7, the overall stacked thickness of optical data storage media 56a, 58a, 56b, and 58b of package 92 is approximately 3.6 mm, rather than a stacked thickness of approximately 4.8 mm which would be exhibited by four conventional DVD disks, i.e., 1.2 mm for each conventional DVD disk. A stacked thickness of 3.6 mm corresponds to an embodiment in which each optical data storage medium having a substantially thin profile of approximately 0.6 mm, a thickness of approximately 1.2 mm defined by the protrusions, and recesses that define a thickness of approximately 0.8 mm with respect to the top surface of the protrusions, i.e., recesses having a depth of approximately 0.4 mm. In embodiments in which the protrusion protrude from the major surface to a height that is greater than the depth of the mated recesses, the protrusions may contact the upper surface of the recesses when stacked, preventing the opposing major surface of adjacent optical data storage media from contacting one another, as previously described. Such a configuration may be particularly useful in cases in which it is desirable to prevent contact between the major surfaces of optical data storage media, e.g., to prevent adhesion between the major surfaces of printable surface optical data storage media.

However, as described above, embodiments of the disclosure are not limited to such dimensions. In other embodiments, the protrusions may protrude from the major surface of a disk-shaped member to a height that is less than the depth of the mated recesses. For example, an optical data storage medium may have a substantially thin profile of approximately 0.7 mm, a thickness of approximately 1.2 mm defined by the protrusions, and recesses that define a thickness of approximately 0.6 mm with respect to the top surface of the protrusions, i.e., recesses having a depth of approximately 0.6 mm. In such a configuration, a package containing four optical data storage media stacked as shown in FIG. 7 would have a stacked thickness of approximately 3.3 mm rather than 4.8 mm. In such embodiments, the thickness of a stack may be minimized and the opposing major surfaces of adjacent optical data storage media may contact one another when stacked, i.e., there is no space between the major surfaces of opposing disk-shaped members.

In other embodiments, the protrusions may protrude from the major surface of a disk-shaped member to a height that is substantially the same as the depth of the mated recesses. For example, an optical data storage medium may have a substantially thin profile of approximately 0.7 mm, a thickness of approximately 1.2 mm defined by the protrusions, and recesses that define a thickness of approximately 0.7 mm with respect to the top surface of the protrusions, i.e., recesses having a depth of approximately 0.5 mm. Again, in such embodiments, the thickness of a stack may be minimized and the opposing major surfaces of adjacent optical data storage media may contact one another when stacked, i.e., there is no space between the major surfaces of opposing disk-shaped members.

In any case, in accordance with some embodiments of this disclosure, the stacked configuration of optical storage media 56a, 58a, 56b, and 58b may facilitate a reduction in the stacking thickness of a package of two or more optical data storage media compatible with a DVD drive compared to that of conventional DVD disks. Depending on the exact thicknesses defined by the optical data storage media, embodiments of optical data storage media in such a stacked configuration may provide for a decrease in stacked thickness up to approximately 50 percent relative to conventional stacks of optical storage media containing the same number of media, such as, e.g., a reduction of greater than approximately 30 percent or a reduction of greater than approximately 40 percent. In other words, assuming an average thickness of 1.2 mm for conventional optical storage media, the average stacked thickness for each optical storage medium in such a stack may be as low as approximately 0.6 mm, such as, e.g., an average stacked thickness of less than approximately 0.84 mm or an average stacked thickness of less than approximately 0.72 mm.

Figure 8A:
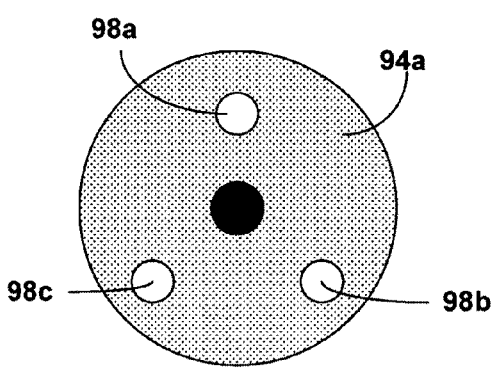
FIGS. 8A-C are top surface views of exemplary protrusion configurations within the clamping area of an optical data storage disk medium.
Figure 9A:
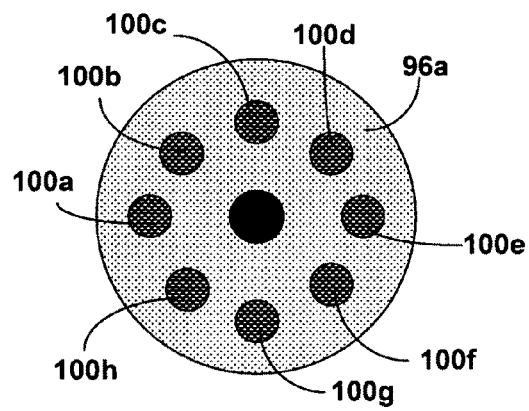
FIGS. 9A-C are bottom surface views of exemplary recess configurations within the clamping area of an optical data storage disk medium.
Figure 8B:
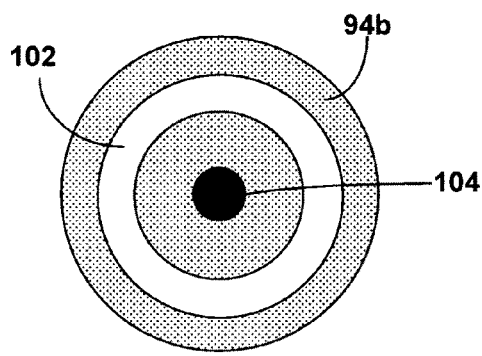
Figure 9B:
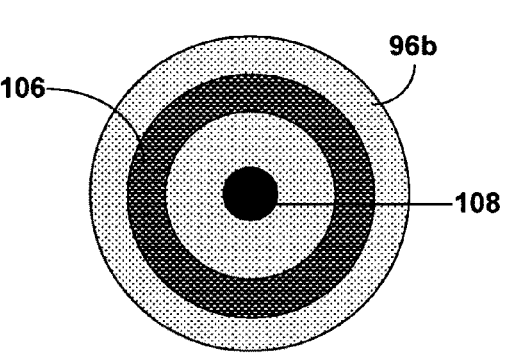
Figure 8C:
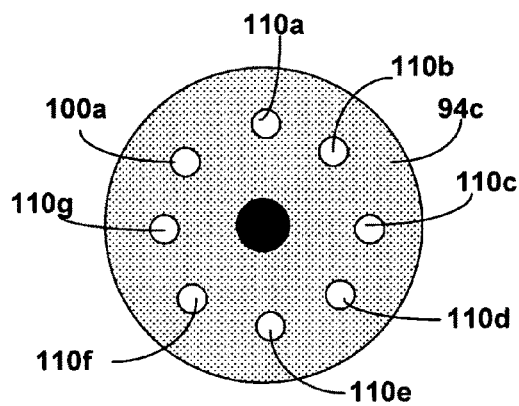
Figure 9C:
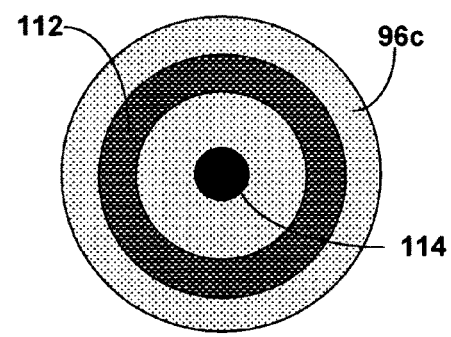

FIGS. 8A-C are top surface views of exemplary protrusion configurations within the clamping areas 94a-c of an optical data storage disk medium, and FIGS. 9A-C are bottom surface views of exemplary recess configurations within clamping areas 96a-c of an optical data storage disk medium configured to mate with exemplary protrusions of FIGS. 8A-C, respectively. For example, clamping area 94a-c may generally correspond to clamping area 66 on the first (top) surface of first disk shaped member 60, and clamping areas 96a-c may generally correspond to clamping area 76 on the fourth (bottom) surface of second disk-shaped member 70.

FIGS. 8A and 9A illustrate an embodiment having a protrusion and recess configuration similar to that of first and second optical storage media 56a and 58a shown in FIG. 5. However, clamping area 94a includes three circular protrusions 98a-c, rather than the four circular protrusions shown in FIG. 5. Clamping area 96a includes eight circular recesses 100a-g which are configured to mate with protrusions 98a-c, as previously described.

FIGS. 8B and 9B illustrate another embodiment in which clamping area 94b includes a single circular protrusion 102 that circumscribes aperture 104, and clamping area 96b includes a single circular recess or channel 106 that circumscribes aperture 108. Circular protrusion 102 and circular recess 106 are configured to mate with one another when stacked as previously described. While FIGS. 8B and 9B illustrate an embodiment including a single circular protrusion 102 within clamping area 94b and a single circular recess or channel 106 within clamping area 96b, in some embodiments, clamping area 94b may include two or more concentric circular protrusions and clamping area 96 may include two or more concentric circular channels, e.g., to provide for a concentric "rib and groove" configuration. Notably, embodiments containing one or more circular recessions, especially those including one or more circular protrusions and circular recessions in a "rib and groove" configuration, may require less precise alignment of the protrusions and recessions when the respective optical storage media are stacked on one another.

FIGS. 8C and 9C illustrate another embodiment in which clamping area 94c includes eight circular protrusions 110a-g even spaced within clamping 94c, and clamping area 96c includes a single circular recess or channel 112 that circumscribes aperture 114. Protrusions 110a-g and circular recess 106 are configured to mate with one another when stacked as previously described. In still another configuration, the top surface (or bottom surface) may include both protrusions and recesses to enable stacking consistent with this disclosure without requiring a specific orientation of the media relative to one another.

While a number of protrusion and recess configurations are described with respect to FIGS. 8A-C and 9A-C, embodiments are not limited as such. Instead, the clamping area of an optical data storage disk accordingly to embodiments of the disclosure may include one or more protrusions and one or more recesses in a configuration that allows the optical data storage disk to be adequately secured or clamped within a DVD drive to function properly while also allowing for the optical data storage medium to be stacked on another optical storage medium with substantially the same configuration in a manner that allows for a reduction in stacked thickness, as described herein.

An optical storage medium may include one or more protrusions in a pattern that is substantially the same as the pattern of the mated recesses. In some examples, the one or more protrusions may substantially correspond to the one or more mated recesses on the opposing side with respect to the axial alignment. In other words, the one or more mated recesses may be formed directly below the one or more protrusions. In other embodiments, the one or more protrusions may not substantially correspond to the one or more mated recesses on the opposing side with respect to the axial alignment. In other words, the one or more mated recesses may not be formed directly below the one or more protrusions even in cases in which they may have the same pattern, but instead the mated recesses may have a different axial alignment than the one or more protrusions. Accordingly, the term "mated recesses" does not require that the recesses have the same axial alignment as the protrusions on the opposing side of a disk-shaped member at least to the extent that the one or more mated recesses are not required to be directly below the one or more protrusions on the opposite surface of the disk-shaped member. However, in some embodiments, the one or more mated recesses may be axially aligned with the one or more protrusions in the opposing surface of a disk-shaped member such that the mated recesses are directly below the protrusion on the opposing surface of a disk-shaped member.

Although the protrusions and recesses of the embodiments illustrated in FIGS. 3 and 7 define cross-sectional profiles that are substantially square with rounded tops, embodiments of the disclosure may include any protrusion and recesses which define profiles having geometries that allows for one or more of the features described herein. For example, the one or more protrusions and/or recesses of a disk-shaped member may define a profile geometry that allows for two or more data storage media to be stacked on another as described herein.

Figure 10A:
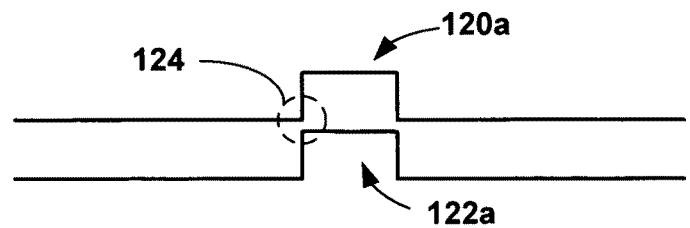
FIGS. 10A-D are cross-section views of exemplary recess and protrusions defining profiles consistent with this disclosure.
Figure 10B:
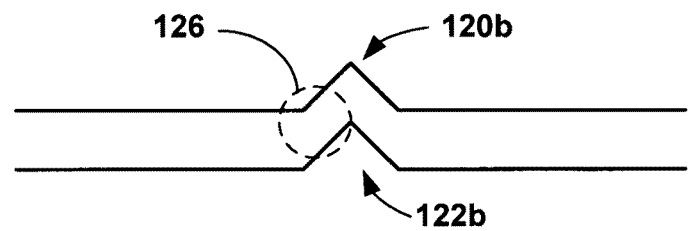
Figure 10C:
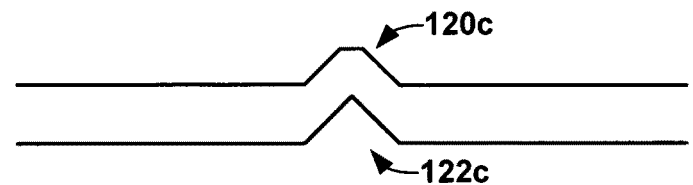
Figure 10D:
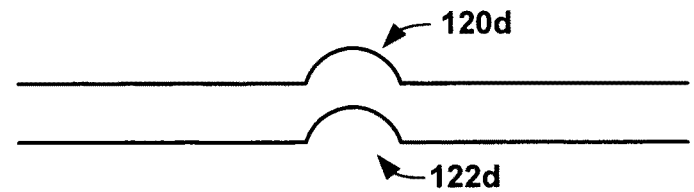

FIGS. 10A-10D are cross-sectional views of example protrusions and recesses defining profiles consistent with the disclosure. FIG. 10A illustrates protrusion 120a and recess 122a that each define cross-sectional profiles that are substantially square, which are substantially similar to that of the profiles illustrated in FIGS. 3 and 7 but without rounded tops. FIG. 10B illustrates protrusion 120b and recess 122b that each define cross-sectional profiles that are substantially triangular. For example, compared to protrusion 120a, the walls of protrusion 120b do not extend perpendicularly from the surface but instead extend substantially linearly at an angle other than that of approximately 90 degrees. FIG. 10C illustrates protrusion 120c that defines a cross-sectional profile that is primarily triangular but include a flattened top, and also illustrates recess 122c that defines a cross-sectional profile that is substantially triangular. FIG. 10D illustrates protrusions 120d and recess 122d that each define hemispheroid cross-sectional profiles. Of course, while the cross-sectional views in FIGS. 10A-10D may illustrate embodiments in which the recess is directly below the protrusions, in some cases, the one or more recesses are not directly below a protrusion. In any case, each of the protrusions and recesses may still define a particular cross-sectional profile geometry.

In some cases, certain cross-sectional profile geometries may be more preferable to others. For example, a cross-sectional profile geometry may be selected based on the dimensions of the respective protrusions and recesses, in addition to their positions relative to one another. In an embodiment in which the recesses and protrusions are orientated as concentric rings, protrusions and recesses that define cross-sectional profiles the same or similar to that shown in FIG. 10B may be more suitable than protrusions and recesses that define profile the same or similar to that shown in FIG.

10A. In one aspect, the triangular profile geometry may allow for greater thickness of the disk-shaped member in the area near the protrusions and recesses compared to that of the thickness resulting from a substantially square profile geometry, e.g., the thickness of the disk-shaped member in area 126 compared to that of the thickness of the disk-shaped member in area 124, respectively. Such a cross-sectional profile may allow for a stronger disk-shaped member while also providing a disk configuration that may be more easily molded during the manufacturing process.

Furthermore, protrusions and/or recesses with walls extending non-orthogonally, such as protrusion 120b and recess 122b, rather than that with walls extending perpendicularly, such as protrusion 120a and recess 122a, may be more readily stacked on one another since the angled geometry may promote self-alignment in cases in which the protrusion is not perfectly aligned with the recesses when being stacked. In some cases, a substantially "square" profile may require the protrusions and recesses to be carefully aligned and then snapped together, which may also complicate the unstacking procedure for a user. Conversely, a "triangular" profile may allow for less precise stacking and allow a user to more easily separate two or more stacked disks.

Although embodiments of the disclosure have been described as including one or more protrusions protruding from the surface of a disk-shaped member within the clamping area, in some embodiments, one or more protrusions may also protrude from the surface of the disk-shaped member proximate the periphery of the disk-shaped member. For example, first and second disk-shaped members 14 and 24 (FIGS. 1-3) may each include one or more protrusions protruding from the top and bottom surfaces, respectively, proximate the outer periphery in a configuration similar to that of first and second protrusions 18 and 28, respectively. As another example, first and second disk-shaped members 60 and 70 (FIGS. 5-7) may each include one or more protrusions protruding from their top surfaces proximate the outer periphery configured similar to that of first and second protrusions 64 and 88, respectively. In this manner, these one or more protrusions protruding from the disk-shaped members proximate the periphery may prevent or mitigate warping of the disk-shaped members when stacked in a configuration in which the major surfaces of the disk-shaped members do not contact or "rest" on each other, e.g., as shown in FIG. 3 and FIG. 7, in addition to providing for improved stacking stability.

Furthermore, although embodiments of the disclosure have been generally described in comparison to optical storage media having a thickness of approximately 1.2 mm, i.e., the thickness consistent with DVD-drive standards, it is recognized that in some cases an optical storage medium may have a thickness of even greater than 1.2 mm over a substantial portion of the disk-shaped member. For example, an optical data storage medium with a printed layer may include two substrates that define a thickness of approximately 1.2 mm and also a printed layer applied on the outer surface of the dummy substrate that has a thickness of approximately 0.3 mm. Overall, such an optical data storage medium may be approximately 1.5 mm thick over those portions including the printed layer. In such a case, some embodiments of the disclosure may allow for configurations that reduce the stacked thickness from 1.5 mm per optical data storage medium rather than 1.2 mm, as described herein. As previously mentioned, configurations that allow optical data storage media with printed layers to be stacked on one another without having the printed surfaces contact one another may prevent undesirable adhesion between opposing surfaces of the storage media when stacked.

Figure 11:
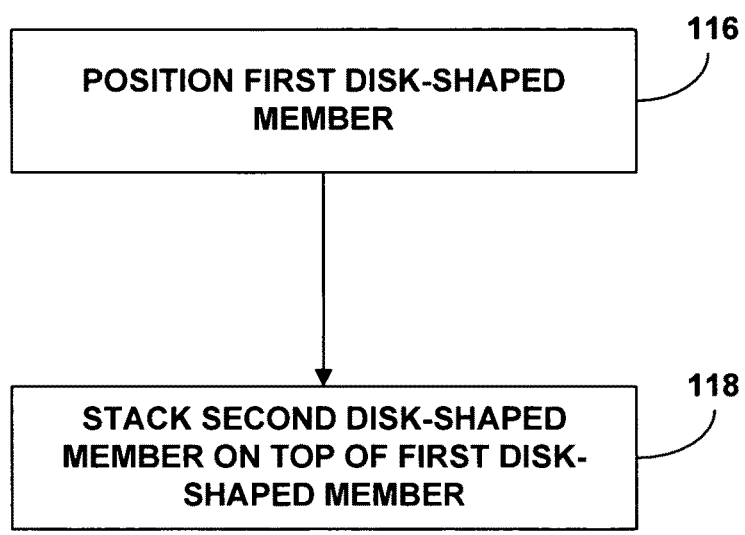
FIG. 11 is a flow chart illustrating an example method for packaging two or more exemplary optical data storage disk media consistent with the disclosure.

FIG. 11 is a flow chart illustrating an example technique for packaging two or more exemplary optical data storage disk media consistent with the disclosure. As indicated in FIG. 11, first optical data storage media may be positioned (116) and second optical data storage may then be stacked on the first optical data storage media (118). Such a technique may be used to package optical data storage media 10a and 10b of FIG. 1 and/or optical data storage media 56a and 58a of FIG. 5. For example, first optical data storage medium 10a may be positioned by placing first optical data storage medium 10a on spindle 36 and then second optical data storage medium 12a may be stacked on first optical data storage medium 10a in the orientation shown in FIGS. 2 and 3.

In general, embodiments of the present disclosure may include any technique suitable for packing two or more optical storage media in a configuration consistent with those disclosed herein. For example, some embodiments may relate to a method of packaging two or more optical data storage media compatible with a digital versatile disk (DVD) drive, the method comprising:

positioning a first disk-shaped member that defines a first surface and a second surface, the first disk-shaped member comprising a first data layer and at least one first protrusion protruding from the first surface in a clamping area, wherein the first surface defines a first thickness less than 1.2 millimeters (mm) and the at least one first protrusion defines a second thickness equal to approximately 1.2 mm; and stacking a second disk-shaped member on top of the first disk-shaped member, the second disk-shaped member defining a third surface and a fourth surface, and comprising a second data layer and at least one second protrusion protruding from the third surface in a clamping area, wherein the third surface defines a third thickness less than 1.2 mm and the at least one second protrusion defines a fourth thickness equal to approximately 1.2 mm; and wherein the second disk-shaped member is stacked on top of the first disk-shaped member that at least a portion first surface contacts the at least one second protrusion when stacked, wherein a laser of the DVD drive reads information associated with the first data surface by interrogating light through at least a portion of the first disk-shaped member, and reads information associated with the second data surface by interrogating light through at least a portion of the second disk-shaped member.

As another example, some embodiments may relate to a method of packaging two or more optical data storage media compatible with a digital versatile disk (DVD) drive, the method comprising:

positioning a first disk-shaped member that defines a first surface and a second surface, the first disk-shaped member comprising a first data layer, at least one first protrusion protruding from the first surface in a clamping area, and at least one first mated recess in the second surface corresponding to the at least one first protrusion, wherein the first surface defines a first thickness less than 1.2 (mm), the at least one first protrusion defines a second thickness equal to approximately 1.2 mm, and the at least one first mated recess defines a third thickness of less than 1.2 mm; and stacking a second disk-shaped member on the first disk-shaped member, wherein the second disk-shaped member defines a third surface and a fourth surface, and comprises a second data layer, at least one second protrusion protruding from the third surface in a clamping area, and at least one second mated recess in the fourth surface corresponding to the at least one second protrusion, wherein the third surface defines a fourth thickness less than 1.2 millimeters (mm), the at least one second protrusion defines a fifth thickness equal to approximately 1.2 mm, and the at least one second mated recess defines a sixth thickness of less than 1.2 mm, wherein the at least one first protrusion protruding from the first surface mates with the at least one second mated recess in the fourth surface when the second disk-shaped member is stacked on the first-disk shaped member, wherein a laser of the DVD drive reads information associated with the first data surface by interrogating light through at least a portion of the first disk-shaped member, and reads information associated with the second data surface by interrogating light through at least a portion of the second disk-shaped member.

Various embodiments have been described. These and other embodiments are within the scope of the following claims.

The invention claimed is:

1. An optical data storage medium comprising:
   a disk-shaped member comprising a first major surface, a data layer and a second major surface;
   a plurality of protrusions protruding from the first major surface of the disk-shaped member in a clamping area thereof; and
   a plurality of mated recesses in the second major surface of the disk-shaped member, the mated recesses defining a different pattern in the second major surface than the plurality of protrusions protruding from the first major surface, wherein a plurality of axes of the protrusions substantially correspond to the plurality of mated recesses with respect to axial alignment;
   wherein the first and second major surfaces define a thickness profile of less than 1.2 millimeters (mm) for the disk-shaped member;
   wherein the plurality of protrusions and the second major surface define a clamping thickness of approximately 1.2 mm in the clamping area of the disk-shaped member; and
   wherein the plurality of mated recesses define at least one mated recess depth in the second major surface of the disk-shaped member, the mated recesses corresponding to the plurality of protrusions protruding from the first surface of the disk-shaped member, such that the optical data storage medium has an average stacking thickness of less than 1.2 mm in a stack of optical storage media having a substantially same configuration.

2. The optical data storage medium of claim 1, wherein the plurality of mated recesses substantially circumscribe a central axis of the disk-shaped member.

3. The optical data storage medium of claim 1, wherein at least one of the mated recesses in the second major surface of the disk-shaped member defines substantially same dimensions as at least one of the plurality of protrusions protruding from the first major surface of the disk-shaped member.

4. The optical data storage medium of claim 1, wherein the disk-shaped member comprises more mated recesses in the second major surface than protrusions protruding from the first major surface.

5. The optical data storage medium of claim 1, wherein the first and second major surfaces define a thickness profile of approximately 0.7 mm or less for the disk-shaped member.

6. The optical data storage medium of claim 1, wherein the average stacking thickness is less than approximately 0.84 mm in the stack of optical storage media having a substantially same configuration.

7. The optical data storage medium of claim 1, wherein at least one of the mated recesses defines a recess depth of approximately 0.4 mm to approximately 0.6 mm in the second major surface of the disk-shaped member.

8. The optical data storage medium of claim 7, wherein the plurality of protrusions define a protrusion height of approximately 0.4 mm to approximately 0.6 mm protruding from the first major surface of the disk-shaped member.

9. The optical data storage medium of claim 1, wherein at least one of the mated recesses in the second major surface of the disk-shaped member is substantially axially aligned with at least one of the plurality of protrusions protruding from the first major surface of the disk-shaped member.

10. A package of optical data storage media comprising:
    a plurality of at least first and second disk members stacked together in the package, each of the plurality of disk members defining first and second major surfaces and having a substantially same configuration comprising:
       a data layer;
       a plurality of protrusions protruding from the first major surface of each disk member in a clamping area thereof; and
       a plurality of mated recesses in the second major surface of each disk member, wherein a plurality of axes of the protrusions of the first disk member substantially correspond to the plurality of mated recesses of the second disk member with respect to axial alignment;
    wherein the first and second major surfaces of each disk member define a thickness profile of less than 1.2 millimeters (mm) for each disk member and the second major surface and the plurality of protrusions define a clamping thickness of approximately 1.2 mm in the clamping area of each disk member; and
    wherein the second disk member is stacked adjacent the first disk member in the package, such that the plurality of protrusions protruding from the first major surface of the first disk member mate with mated recesses of the plurality of mated recesses in the second major surface of the second disk member, the first and second disk members defining a stacked thickness of less than 2.4 mm when stacked together in the package.

11. The package of claim 10, wherein the at plurality of mated recesses define different pattern in the second major surface of each disk member than the plurality of protrusions in the first major surface.

12. The package of claim 10, wherein at least one of the mated recesses in the second major surface of each disk member has a different axial alignment than the plurality of protrusions protruding from the first major surface.

13. The package of claim 10, wherein each disk member comprises a different number of protrusions protruding from the first major surface than mated recesses in the second major surface.

14. The package of claim 10, wherein the plurality of protrusions define a height of approximately 0.4 mm to approximately 0.6 mm protruding from the first major surface of each disk member, and wherein at least one of the mated recesses defines a depth of approximately 0.4 mm to approximately 0.6 mm in the second major surface of each disk member.

15. The package of claim 10, wherein the plurality of disk members comprises at least a third disk member stacked adjacent the second disk member in the package, the third disk member having the substantially same configuration and a substantially same orientation as the second disk member, such that the plurality of protrusions protruding from the first major surface of the second disk member mate with at least one of the mated recesses in the second major surface of the third disk member.

16. The package of claim 10, wherein the plurality of protrusions protrude from the first major surface to a height that is greater than a depth of at least one of the mated recesses in the second major surface, such that the first major surface of the first disk member is prevented from contacting the second major surface of the second disk member when the first and second disk members are stacked together in the package.

17. The package of claim 10, wherein the plurality of disk members define an average stacking thickness of less than approximately 1.08 mm when stacked together in the package.

18. The package of claim 10, wherein the plurality of disk members define an average stacking thickness of less than approximately 0.84 mm when stacked together in the package.

19. The package of claim 10, wherein the plurality of protrusions protruding from the first major surface of each disk member comprises at least three protrusions protruding from the clamping area of each disk member, and wherein the plurality of mated recesses comprises more than three mated recesses in the second major surface of each disk member.

\* \* \* \* \*

UNITED STATES PATENT AND TRADEMARK OFFICE
CERTIFICATE OF CORRECTION

| | | |
|---|---|---|
| PATENT NO. | : 8,561,093 B2 | Page 1 of 1 |
| APPLICATION NO. | : 12/380341 | |
| DATED | : October 15, 2013 | |
| INVENTOR(S) | : Eric D. Levinson et al. | |

It is certified that error appears in the above-identified patent and that said Letters Patent is hereby corrected as shown below:

In the Claims

In Claim 11

Column 22, Line 43, "the at plurality of" should be --the plurality of--

Column 22, Line 44, "define different pattern" should be --define a different pattern--

Signed and Sealed this
Fifteenth Day of April, 2014

Michelle K. Lee
*Deputy Director of the United States Patent and Trademark Office*